Jan. 28, 1964   W. C. TIMMERMAN, SR., ETAL   3,119,407
AUTOMATIC SHUT-OFF VALVE FOR FLEXIBLE-WALLED CONTAINERS
Filed May 3, 1961   7 Sheets-Sheet 1

FIG. 1.

Jan. 28, 1964   W. C. TIMMERMAN, SR., ETAL   3,119,407
AUTOMATIC SHUT-OFF VALVE FOR FLEXIBLE-WALLED CONTAINERS
Filed May 3, 1961                                7 Sheets-Sheet 2

Jan. 28, 1964  W. C. TIMMERMAN, SR., ETAL  3,119,407
AUTOMATIC SHUT-OFF VALVE FOR FLEXIBLE-WALLED CONTAINERS
Filed May 3, 1961  7 Sheets-Sheet 7

3,119,407
AUTOMATIC SHUT-OFF VALVE FOR FLEXIBLE-
             WALLED CONTAINERS
Walter C. Timmerman, Sr., and Walter C. Timmerman, Jr., Houston, Tex., assignors to United States Rubber Company, New York, N.Y., a corporation of New Jersey
             Filed May 3, 1961, Ser. No. 107,496
                4 Claims. (Cl. 137—386)

This invention relates to an underwater liquid storage system and, more particularly, to such a storage system utilizing rubber-like collapsible containers.

Underwater storage systems have been disclosed in a number of United States patents. (See, for example, U.S. Patent Nos. 2,383,840 and 2,487,786.) The storage systems disclosed therein, however, have all contemplated the utilization of smaller flexible storage tanks. Where a storage system is to hold quantities of liquids in the range of 1200 barrels to 25,000 barrels, additional problems arise which have not been encountered previously. It is the object of the present invention, therefore, to provide a solution to these problems for a system of this size.

Since the flexible, collapsible container itself must not only function as an underwater storage tank, but must also serve as an expellant bag (see especially U.S. Patent No. 2,383,840), it must be designed so that the collapsing and expanding that occur during repeated filling and emptying cycles will not cause damage during the course of long periods of service. In addition, the flexible container must withstand the environmental conditions associated with extended underwater storage and must not be adversely affected by sea water and marine growth.

Additionally, the underwater storage of large quantities of liquids raises problems in anchoring the apparatus to the bottom of the body of water in which it is submerged and also problems concerning restraining and holding the containers themselves in proper position relative to the anchoring system. Where the liquid to be stored has a specific gravity less than that of water, for example, fuel oil, the assembly must be capable of withstanding large buoyant forces. It must also be able to withstand the horizontal drag forces produced by strong underwater currents and must be able to support the weight of the flexible container and attached equipment when the same is empty. If the collapsible container itself is to vary in profile from a flat envelope in the empty state to an approximately oval, elliptical or cylindrical shape in the filled state, the restraining system must not impair the ability of the container to thus change its shape.

The anchoring system must be designed with an adequate safety factor, so that failure of one component will not result in a storage container breaking loose. The safety factor must also be sufficient to compensate for corrosion and the consequent gradual deterioration which results therefrom. The anchoring system also must be suitable for use in both hard and soft bottom conditions.

A filling and emptying hose is, of course, an indispensable part of any underwater liquid storage system. Such a hose would normally abrade and/or apply other destructive forces to a rubber-like container. Thus, some form of header tank has been found necessary to absorb these forces and leave the flexible container undisturbed. The header tank would normally be anchored to the sea floor adjacent to one end of the flexible container. Where, however, the underwater storage system comprises a number of collapsible containers, a long header tank is advisable to serve as a manifold for the multiple installation, so that one set of filling and emptying hoses can serve all the flexible containers.

The large volume storage system herein contemplated requires a means of accurately measuring the quantity of liquid stored in the containers at any time. Thus, it is necessary to have a metering system to indicate the amount delivered to or withdrawn from the containers. Furthermore, since it must be assumed that no single agency or vessel will use the storage system, it is essential that this metering system comprise self-contained instrumentation equipment.

Since the basic container unit itself is, of course, constructed of flexible material, a positive means to prevent over-filling the same is also an absolute necessity. Thus, the underwater storage system herein contemplated requires a completely reliable automatic shut-off valve positioned at each individual container. The valve must be capable of preventing over-filling, which could cause total destruction and loss of contents.

In some installations it may be desirable to protect the flexible containers from contact with the filling and emptying hoses and the various anchor lines required. If so, an intermediate underwater floating swivel-type buoy can be used. The buoy would provide intermediate support for the hose and, as such, would have to be adapted to withstand those forces that would otherwise be transmitted directly to the underwater containers.

Hence, it is an object of the present invention to design an underwater storage system utilizing lightweight flexible storage containers that can function as a repository for amounts of liquids ranging from a few barrels to 25,000 barrels or more in each assembly.

It is a further object of the present invention to provide such an underwater cache that will be suitable for the storage of a variety of liquids, especially fuel oils.

It is a further object of the present invention to design a storage system that will solve all of the above-enumerated problems peculiar to large installations.

In accordance with these objects, we have designed an underwater liquid storage system comprising one or more essentially fluid-impermeable, flexible collapsible storage containers. Based on the principle of water displacement, the containers will change shape whenever liquids are induced or withdrawn and thus no differential pressure will occur across the container wall notwithstanding the buoyant force of the contained liquid. The containers themselves are horizontally oriented and are disposed within a substantially rectangular, rigid frame adapted to rest on the bottom of the body of water in which they are submerged. Means are provided to anchor the collapsible containers and enclosing frame to the bottom and to restrain them from movement due to buoyant forces and wave and current forces.

The system further comprises a plurality of straps extending in two mutually perpendicular directions and attached to the rigid frame, said straps forming a network to enclose the collapsible containers top and bottom and to restrain them from vertical movement when filled and from rubbing on the bottom when empty. The straps thus form a restraining harness and, being flexible, will not prevent the containers from changing shape when liquids are withdrawn or added. The system further comprises a header tank communicating with the individual containers. A filling and emptying hose attached at one end to the header tank and having a valve at its other end is also provided.

An underwater buoy disposed directly above the container system and adapted to provide intermediate support for the filling and emptying hose may be a part of the system. Means are provided to indicate the volume of liquid stored in the system at all times and means are also provided to prevent over-filling of the individual containers. Finally, the system comprises means to raise the end of the filling and emptying hose adjacent the surface of the water.

The invention having been broadly described, a more detailed description is given hereafter with reference to the accompanying drawings, wherein.

The Overall System

Figure 1:
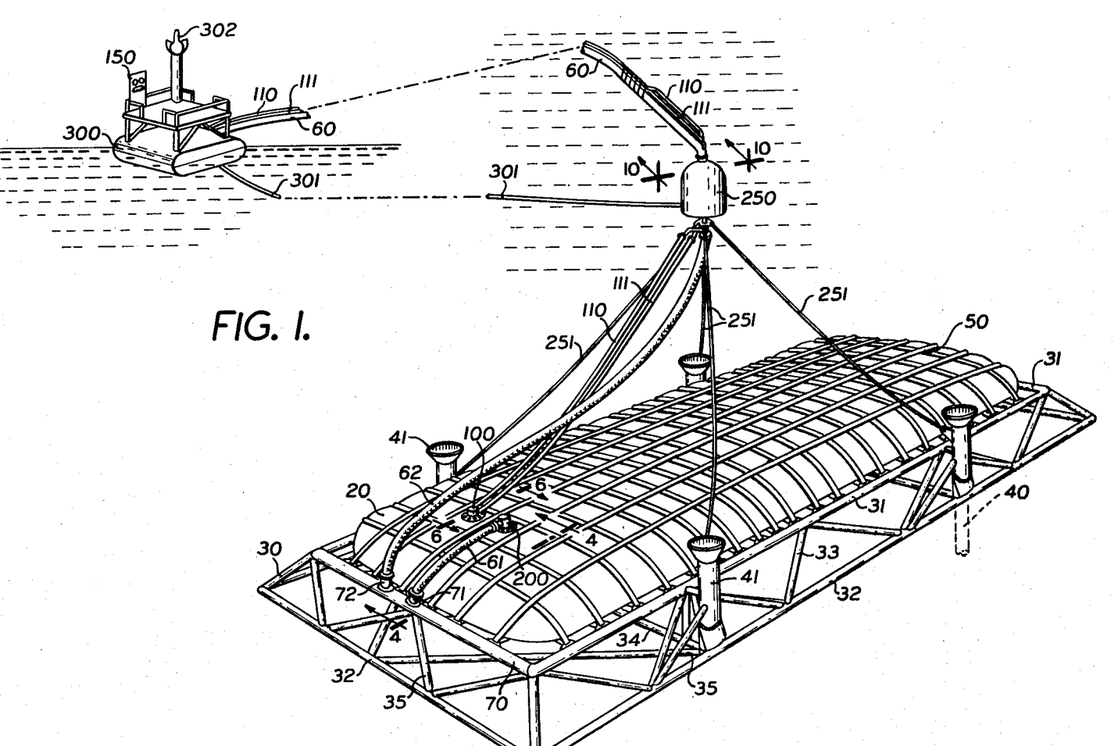
FIG. 1 is a perspective view of a 1200 barrel (50,000 gallon) underwater liquid storage system, having a single flexible, collapsible container, which will be used to illustrate the invention.

FIG. 1 illustrates a 1200 barrel (50,000 gallon) underwater liquid storage system, particularly designed for offshore storage of fuel oil. In general, the system comprises a flexible, collapsible container 20 enclosed within a substantially rectangular, rigid frame 30, which is adapted to rest on the bottom of the body of water in which the system is submerged.

The frame 30 is anchored to the bottom and restrained from lateral movement by means of four piles 40. A network of straps 50 forming a tank-restraining harness encases the container 20 top and bottom and suspends it within the rigid frame 30.

Filling and emptying of the container 20 is accomplished by means of a flexible hose 60, which extends from the surface of the body of water to a header tank 70, which is an integral part of the rigid frame 30. The header tank 70 itself communicates directly with the container 20 by means of a flexible hose 61.

The system is equipped with a metering system adapted to indicate the volume of fuel contained at all times. The metering system comprises a pressure actuated signaling device 100, pressure lines 110 and 111, and a manometer type of visual gauge 150 which is supported at the surface.

To prevent the possibility of over-filling the container, it is equipped with an automatic shut-off valve 200, which operates mechanically when the container 20 is expanded to the depth that provides the specified capacity.

To protect the container 20 from contact with the filling and emptying hose 60 and the various anchor lines required, an intermediate underwater floating swivel-type buoy 250 is provided, as shown in FIG. 1. Buoy 250 is maintained in position by four steel cables 251, as shown.

Finally, hose 60 is supported at the surface of the water by a floating buoy 300, having suitable liquid transfer control valves. Buoy 300 is maintained in position by a steel cable 301 connecting it with underwater buoy 250. Buoy 300 may desirably by provided with a navigation light 302; the buoy also furnishes support for manometer 150.

Each of these components will now be described in complete detail, thus to constitute a full disclosure of the invention.

The Flexible Container

The container 20 is formed in the shape of a rectangular flat envelope. When filled to rated capacity, it is approximately elliptical in cross-section. To have a 50,000 gallon capacity, it should be approximately 22 feet wide by 70 feet long when empty; when filled to rated capacity it will then be approximately 20 feet wide, 68 feet long and 6 feet high. The general configuration of the filled container is best described by the adjectives "pillow-shaped" or "oval-shaped," although it should be understood that modifications in the basic shape are possible.

Due to its shape, container 20 will not fold or crease during the transition from the full to the empty condition. The minimum of flexing which occurs thus insures a long service life.

Container 20 is constructed of two plies of nylon fabric coated with appropriate synthetic rubber compounds. The nylon fabric used in the inner ply is a 4 ounce square woven material. This inner ply, which is exposed to the liquid contents, is coated on both sides with a fuel resistant Buna N compound.

The outer ply is used primarily for reinforcement. A 13 ounce square woven nylon fabric has been found suitable. This ply is coated on the hidden side with a Buna N compound and on the outer surface, which is exposed to the elements, with neoprene, which has been used as an exterior coating on marine hose for many years. The coating compounds used are basically the same as those used to coat flexible fabric ground storage containers in use for many years.

Containers constructed as above described have withstood satisfactorily the environmental conditions associated with extended periods of underwater storage. Although they become covered with marine growth, the material does not deteriorate. Furthermore, the above-described construction is resistant to diffusion by sea water, that is, the construction does not permit any permeation or diffusion of either water or fuel oil through the container wall. Thus, the construction is essentially fluid impermeable.

The 50,000 gallon container weighs approximately 1800 pounds. The total thickness of the container wall is 0.09 inch, thus the weight of the construction is in the order of 0.50 pound per square foot.

Tank-Restraining Harness

Figure 2:
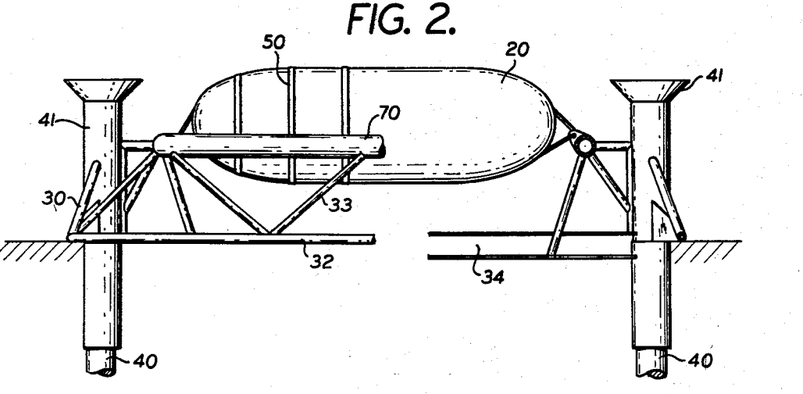
FIG. 2 is an end view, partly in section, of the container, rigid frame, anchoring means and header tank of the system shown in FIG. 1.

As shown in FIGS. 1 and 2, container 20 is encased in a network of straps 50, which forms a tank-restraining harness. The straps 50 suspend the container within the rigid frame 30.

The network of straps 50 provides adequate support to container 20 to resist buoyant loads when filled with fuel oil and also supports the weight of the container assembly when empty. The straps themselves are fabricated of synthetic fiber webbing, preferably of high strength nylon or "Dacron" brand polyester fiber, which resists deterioration from exposure to salt water and marine organisms. The individual straps should have tensile strengths in the range of 20,000 to 30,000 pounds. Webbing 3½ inches wide has been found to be satisfactory.

Figure 4:
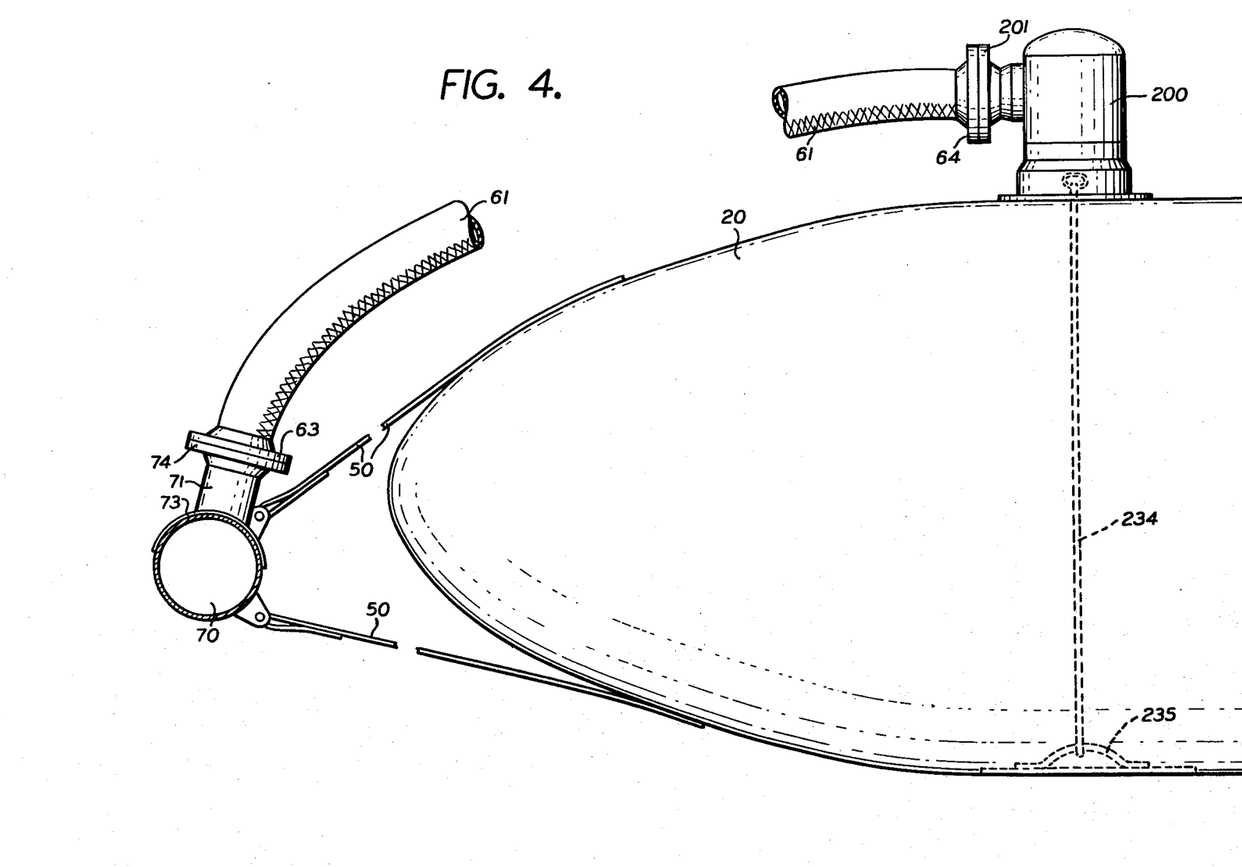
FIG. 4 is a sectional view taken on line 4—4 of FIG. 1 and showing the automatic shut-off valve in elevation.

Loop splices are required in the ends of the individual straps to transfer the load to frame 30. The splices are made by sewing them with maximum stitch efficiency. A rubber spool is used in the loop and the attachment to frame 30 is made by means of a pin through the hole in the spool. Attachment of the straps to the frame is illustrated in FIGS. 1, 2 and 4.

Anchoring System

Container 20 is attached by means of the above-described tank-restraining harness to a substantially rectangular, rigid frame 30, which is adapted to rest on the bottom of the body of water in which the entire system is submerged. Frame 30 is itself anchored to the bottom and restrained from lateral movement by means of four piles 40. The frame 30 and the piles 40 comprise the anchoring system.

An underwater storage system designed to hold 50,000 gallons of 0.88 specific gravity fuel oil will generate a buoyant force of 1.26 pounds/gallon or a total vertical force of approximately 63,000 pounds. Additionally, a 5 knot current acting on the full length of a container of the size of container 20 will generate a drag load of approximately 25,300 pounds. Thus, the anchoring system must be adequate to withstand both forms of loading plus forces generated by wave action.

The combination of frame 30 and piles 40 is satisfactory to stabilize the container and prevent lateral movement under the worst combination of loading. It would be completely unreasonable to attempt to anchor the container with ballast alone, as the very substantial lateral or drag forces that are encountered (as mentioned above) would cause the entire assembly to move in a horizontal direction even though the amount of ballast be far greater than the buoyancy produced by the 50,000 gallons of fuel oil. Thus, the combination of the rigid structural frame and the four piles provides the necessary resistance in the most economical manner.

Frame 30, when attached to piles 40, supplies the necessary ballast and bending strength to maintain the container 20 in the desired attitude. Piles 40 are sufficient to withstand the worst lateral forces that are encountered.

As can be seen from FIGS. 1 and 2, frame 30 is built in a substantially rectangular shape. Upper chord members 31 are joined to lower chord members 32 by a tubular steel truss 33. Container 20 is suspended from upper chord members 31 by means of the network of straps 50. Upper and lower chord members 31 and 32 are also formed of tubular steel pieces.

Piles 40 are made of steel and are driven through four guides 41 on frame 30 to a penetration of approximately 80 feet. Piles 40 are preferably made 20 inches in diameter. Since the lower chord members 32 will normally be buried to some extent in the mud of the bottom, guides 41 actually penetrate the mud for a distance of several feet (see FIG. 2) and act to stabilize the entire assembly when it is lowered in position and before the piles are driven.

Lower chord members 32 are provided with I-beam shaped cross members 34 for rigidity and strength. Additional lateral braces 35 are provided as required.

Pile-to-jacket connections (not shown) lock piles 40 to guides 41 and maintain stability of frame 30 and container 20 in the desired position.

In practice, the complete assembly of container 20, frame 30 and piles 40 is normally assembled on shore and towed or otherwise transported to the location site. Tubular frame 30 is then flooded with water, thus to cause the entire assembly to sink. This procedure fully utilizes the weight of frame 30 as ballast. The total weight of frame 30 and piles 40 is approximately 82,000 pounds, which may be compared to the above-calculated buoyant force of 63,000 pounds, and is sufficient to withstand the buoyant force. The piles 40 are designed to counteract lateral forces created by underwater currents and waves and also supply additional holding forces to withstand the buoyant force.

Header Tank

As shown in FIGS. 1 and 2, one of the steel tubes forming the upper chord member 31 of frame 30 is utilized as a header tank 70. Header tank 70 protects flexible container 20 from damage, as above described.

Header tank 70 is preferably constructed of 12¾ inches by 0.312 inch thick steel tubing. This weighs approximately 41.5 pounds per linear foot in air and, therefore, has a buoyant force of 15 pounds per linear foot when submerged in water. The tubing has a gross weight of 85 pounds per linear foot in air when filled with 0.88 specific gravity fuel oil and thus weighs 29 pounds per linear foot when submerged.

Header tank 70 has two flange connections 71 and 72. Connection 71 joins the tank to flexible hose 61, which communicates directly with container 20; connection 72 joins the tank to the main hose 60 via another length of flexible hose 62. (See FIG. 1.) Thus, header tank 70 absorbs the forces from fuel hose 60 and leaves container 20 undisturbed.

Connection 71 consists of a standard 6 inch diameter pipe saddle 73 and a standard slip-on flange fitting 74, adapted to be connected to a flange fitting 63 on the end of hose 61. (See FIG. 4.) Hoses 61 and 62 are preferably made of 6 inch diameter fuel-resistant line.

Automatic Shut-Off Valve

Figure 5:
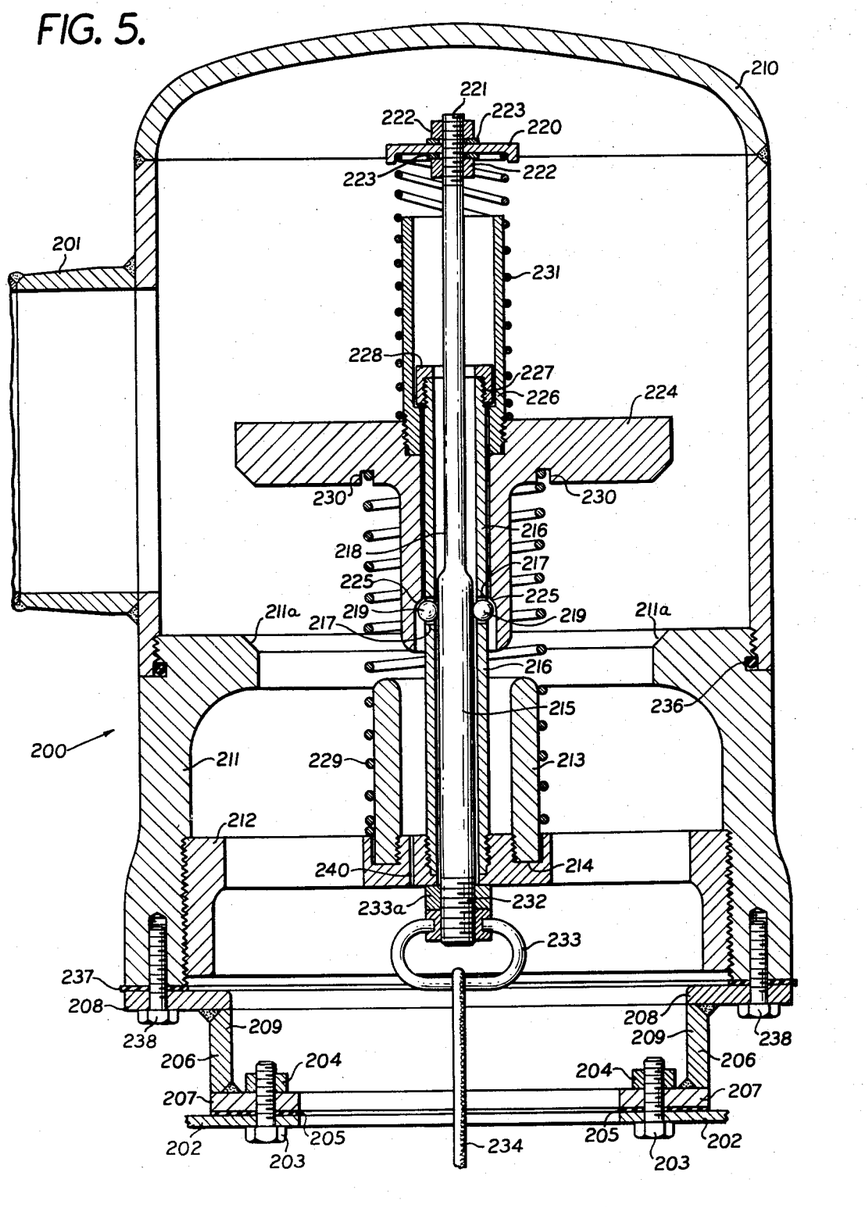
FIG. 5 is a vertical sectional view taken through the centerline of the automatic shut-off valve of FIG. 4.

FIGS. 1, 4 and 5 show the automatic shut-off valve 200, which is attached directly to container 20 to prevent overfilling, as above described.

Valve 200 connects hose 61 to container 20, as shown in FIG. 4. Hose 61 terminates in a standard flange fitting 64, which is adapted to be connected to a flange fitting 201, welded or otherwise attached to the side of valve 200.

Valve 200 is positioned on the upper side of container 20 in such a manner as to be at the high point of the container when filled. As shown in FIG. 5, it is attached to a manhole cover plate 202 by bolts 203 and nuts 204. A gasket 205 insures a tight seal between manhole cover plate 202 and the lower housing 206 of the valve. Lower housing 206 is itself built up of suitably sized annular plates 207 and 208 and a cylindrical section 209, which are joined together by welding or other suitable means. Manhole cover plate 202 is, in turn, attached to a fitting molded as an integral part of container 20.

Valve 200 has a bell-shaped body portion 210, to which flange fitting 201 is attached. Fuel oil is pumped into the body portion 210 by means of hose 61, as above described, and thence into container 20.

The lower part of valve 200 is comprised of a body portion 211. Disposed within valve body portion 211 is a guide mount 212, threadedly engaged as shown in FIG. 5. Disposed in guide mount 212 is a shock chamber ring 213, which is threadedly engaged into an annular seat 214 in guide mount 212. A shaft 215, having a reduced diameter upper portion 218, also fits within guide mount 212, as shown.

A guide sleeve 216 fits around shaft 215 and is provided with two drilled holes 217 to accommodate two steel balls 219.

A spring retainer plate 220 is attached to the upper end 221 of shaft 215 by means of two nuts 222 and two washers 223, threadedly engaged with shaft 215.

Mounted exteriorly of guide sleeve 216 is a plunger 224. Plunger 224 is recessed as at 225 to accommodate steel balls 219. The lower surface of plunger 224 is adapted to contact the upper part of valve body 211, which is formed into a valve seat 211a.

Threadedly engaged with plunger 224 is a spring retaining sleeve 226. Threadedly engaged to the end 227 of guide sleeve 216 is a valve stop 228.

A valve return spring 229 is disposed around shock chamber ring 213 and is seated in an annular slot 230 in plunger 224. A shaft return spring 231 is disposed around retaining sleeve 226, the upper end being seated in spring retainer plate 220, the lower end resting against the upper surface of plunger 224.

Threadedly engaged to the bottom end 232 of shaft 215 is a lanyard fitting 233, which is attached by means of a lanyard cord 234 to a fitting 235 attached to the opposite side of container 20. (See FIG. 4.) Lanyard fitting 233 is retained in position on end 232 of shaft 215 by a lock nut 233a.

An O-ring 236 is used to insure a tight connection between valve body 211 and bell-shaped body portion 210.

In turn, valve body 211 is sealed to plate 208 of lower housing 206 by a body sealing gasket 237. Connection is made between valve body 211 and plate 208 by means of bolts 238.

In operation, fuel oil is pumped through hose 61 and flange fitting 201 into body portion 210 of valve 200. During the initial filling operation, plunger 224 is locked in an upward position by the two balls 219, which fit into recess 225. Plunger 224 remains locked in this position until sufficient fuel oil is pumped into container 20 to cause lanyard cord 234 to pull shaft 215 downwardly enough to release balls 219. When balls 219 are free to move inwardly adjacent the upper portion 218 of shaft 215, plunger 224 is released.

Release of plunger 224 allows shaft return spring 231, which was compressed when shaft 215 was pulled downwardly, to force plunger 224 down. Fuel oil flowing through flange fitting 201 also exerts pressure on the upper surface of plunger 224. This pressure, in combination with the pressure exerted by shaft return spring 231, causes plunger 224 to descend and fit tightly against valve seat 211a. This action closes off the interior of container 20, thereby preventing over-filling.

To prevent plunger 224 from ramming sharply against valve seat 211a, thereby to cause damage to both, the lower portion of plunger 224 is adapted to fit within shock chamber ring 213. Shock chamber ring 213 can be equipped with small vent holes at its base (not shown) or a bleeder hole 240 can be drilled, as shown, in guide mount 212. This will permit fuel oil trapped between plunger 224 and shock chamber ring 213 to be forced out slowly, thus providing the necessary damping action.

Plunger 224 remains seated against valve body 211 until the fuel pumping is terminated or until a valve between flange fitting 201 and the fuel pump is closed. As soon as the fuel flow is cut-off by either of the abovementioned methods, valve return spring 229 causes plunger 224 to move upwardly, thereby opening valve 200. The valve will remain in this position until such time as additional fuel is pumped into container 20.

An additional safety feature has been incorporated into valve 200 to prevent over-filling in case the above-described mechanism fails for any reason. If plunger 224 does not descend against valve seat 211a of valve body 211 due to failure of shaft return spring 231, sticking of balls 219 or any other reason, additional force applied to lanyard fitting 233 will compress spring 231 sufficiently to permit spring retainer plate 220 to contact sleeve 226. Since sleeve 226 is positively attached to plunger 224, it will force the latter down until the plunger ultimately comes in contact with valve seat 211a, thereby shutting off the fuel flow. This provides a safeguard which can only be rendered inoperative by a total mechanical failure of valve 200.

In the event that valve 200 is shut off by this above-described pulling down of plunger 224, the fuel system pumps will have to be reversed to create a suction pressure above plunger 224 to lift the same. Such suction, when sufficient to overcome the force exerted by lanyard cord 234, will cause plunger 224 to move upwardly, thereby disengaging it from valve seat 211a.

When emptying container 20, the operation is virtually the opposite of that above-described. Plunger 224 is maintained in an upward position by valve return spring 229, thereby permitting fuel oil to flow readily between valve body 211 and plunger 224 and ultimately through flange fitting 201 and out through hose 61.

Thus, automatic shut-off valve 200 is seen to be a positive means of preventing over-filling of container 20. It is completely reliable and is required by a system of this type.

*Metering System*

FIGS. 1 and 6–9 show the metering system, which is adapted to indicate the volume of fuel contained at all times. Broadly, the metering system comprises a pressure actuated signaling device 100, which is connected to a manometer type of visual gauge 150 by pressure lines 110 and 111.

Figures 6, 7, 8:
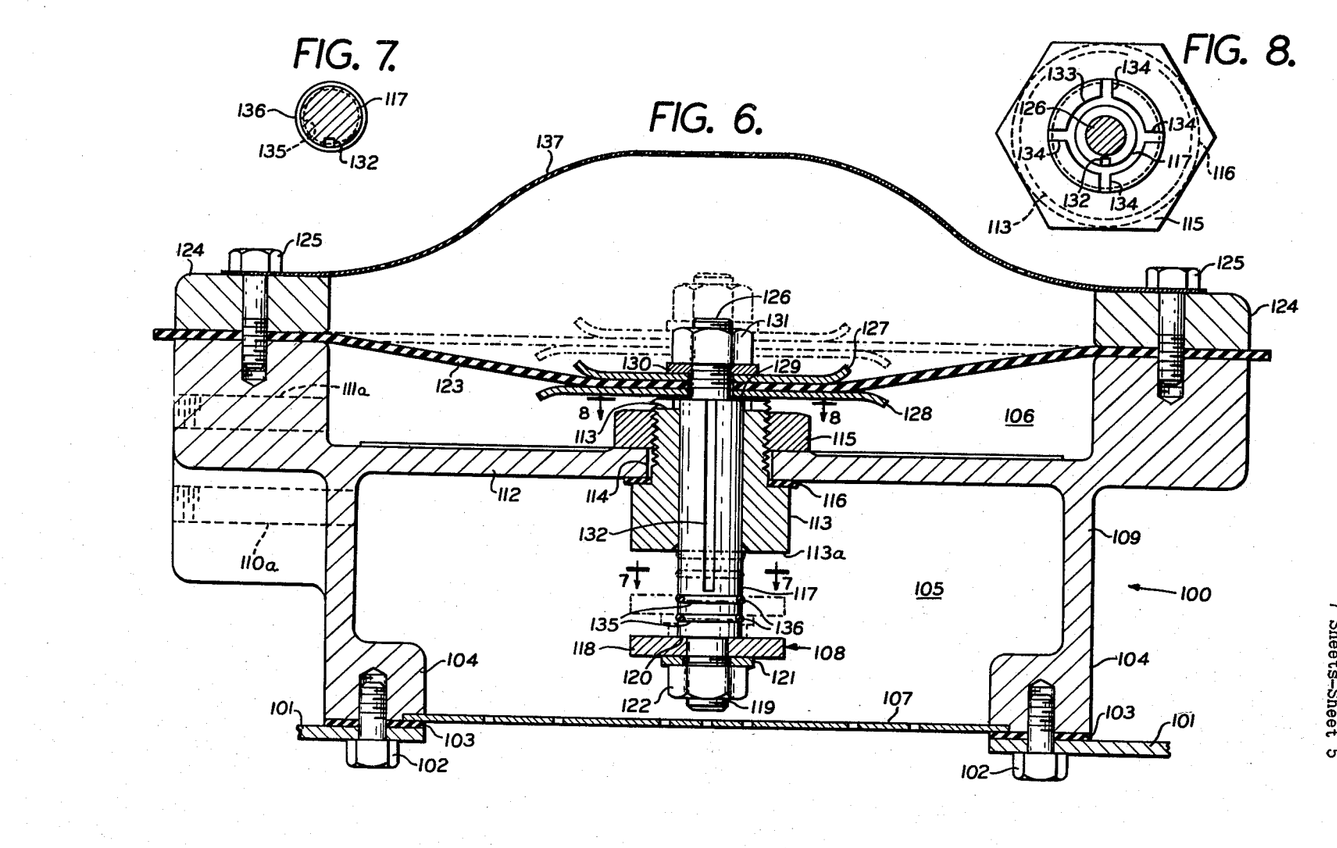
FIG. 6 is a sectional view taken on line 6—6 of FIG. 1 and showing the construction of one of the components of the metering system.
FIG. 7 is a sectional view taken on line 7—7 of FIG. 6.
FIG. 8 is a sectional view taken on line 8—8 of FIG. 6.

Signaling device 100 is positioned on the upper side of container 20 in such a manner as to be at the high point of the container when filled. As shown in FIG. 6, it is attached to a manhole cover plate 101 by bolts 102. A gasket 103 insures a tight seal between manhole cover plate 101 and the lower housing 104 of the device. Manhole cover plate 101 is attached to an integrally molded fitting in container 20.

The device 100 is essentially comprised of a lower chamber 105 and an upper chamber 106. Lower chamber 105 is separated from the interior of container 20 by a perforated guard plate 107. Plate 107 serves merely to protect the mechanism 108 extending into lower chamber 105.

The body portion 109 of device 100 is essentially as shown in FIG. 6. Drilled holes 110a and 111a serve to accommodate pressure lines 110 and 111, respectively, as above described. Body portion 109 includes a central plate 112, which serves to divide the device into the two chambers 105 and 106, above mentioned.

A bearing 113 fits into a hole 114 in plate 112. Bearing 113 is maintained in position in hole 114 by a retainer nut 115, threadedly engaged as shown. A gasket 116 insures a tight seal.

A push rod 117 fits within bearing 113, as shown. Push rod 117 is threaded at each end. The ends are of reduced diameter. A stop ring 118 fits on the lower end 119 of push rod 117 and is seated against shoulder 120, which is formed by the reduction in diameter. Ring 118 is maintained in position by a lock nut 121 and a hex head nut 122.

Upper chamber 106 is defined by a rubber diaphragm 123, which is clamped to body portion 109 by a retainer ring 124. Retainer ring 124 is bolted to body portion 109 by a plurality of bolts 125, only two of which are illustrated in FIG. 6.

The upper end 126 of push rod 117 is connected to rubber diaphragm 123 by two dish-shaped retainer plates 127 and 128, as shown. Again, since the upper end 126 of push rod 117 is of reduced diameter, a shoulder 129 is formed, against which retainer plate 128 can rest. Retainer plates 127 and 128 are maintained in position by a lock nut 130 and a hex head nut 131.

Lower chamber 105 and upper chamber 106 communicate with each other by means of a slot 132 machined in the surface of push rod 117. This is as shown in FIGS. 6, 7 and 8. When a portion of slot 132 extends below the lower surface 113a of bearing 113, fuel oil in lower chamber 105 can flow upwardly along slot 132 and thence into upper chamber 106.

The upper surface 113b of bearing 113 is grooved, as shown in FIG. 8. A circular slot 133 communicates with slot 132 in push rod 117, thus to permit the fuel oil which comes from lower chamber 105 to flow out into upper chamber 106. Circular slot 133 in turn communicates with four radially-extending slots 134 and it is along these that the fuel oil flows.

Push rod 117 is provided with two circumferentially extending grooves 135, as shown in FIGS. 6 and 7. Two O-ring seals 136 fit in grooves 135. When push rod 117 is pulled up sufficiently far to cause O-ring seals 136 to engage the lower surface 113a of bearing 113, slot 132 is completely closed off from any communication with lower chamber 105. This prevents any further flow of fuel oil into upper chamber 106.

Rubber diaphragm 123 is protected from the elements by a perforated protective shield 137.

Lower chamber 105 and upper chamber 106 are connected to manometer 150 by the two pressure lines 110 and 111, respectively. This is shown diagrammatically in FIG. 9. Pressure line 110 is equipped with a valve V–110 at its upper end (adjacent manometer 150) and pressure line 111 is similarly equipped with a valve V-111 at its end. The left-hand manometer tube 151 is equipped with two valves V-152 and V-153, as shown. Similarly, the right-hand manometer tube 154 is equipped with two valves V-155 and V-156, as shown. Pressure line 110 terminates in an exit nozzle 157; pressure line 111 terminates in an exit nozzle 158.

Figure 9:
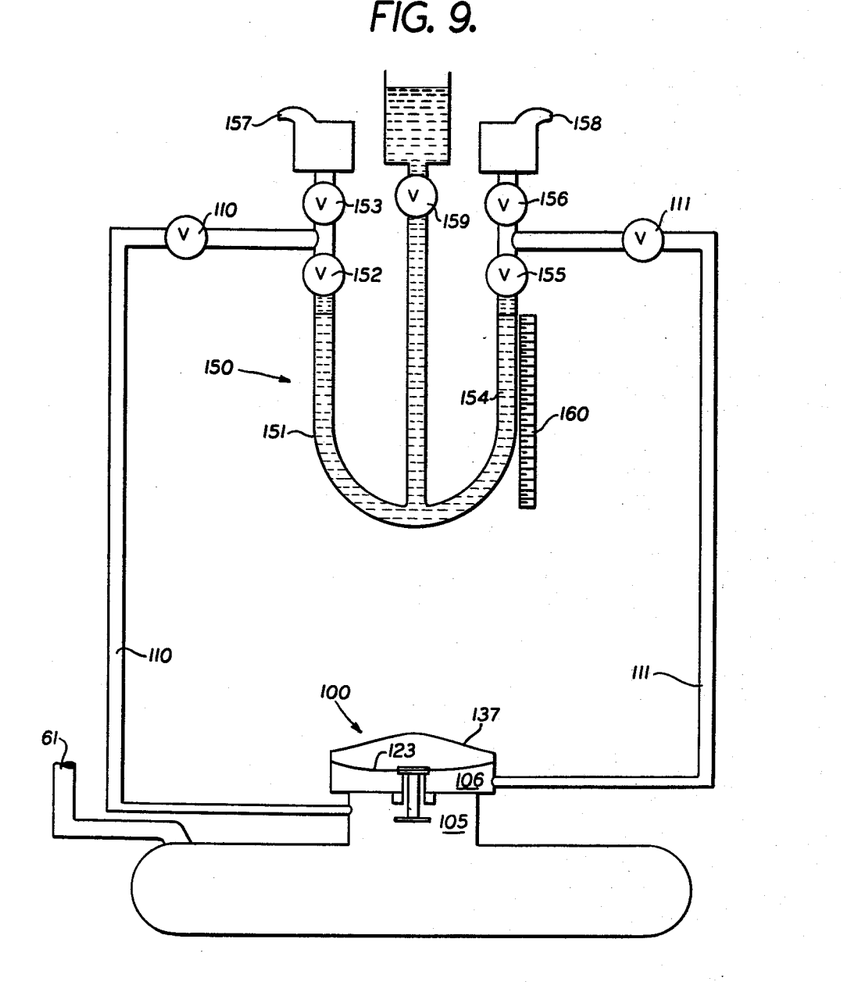
FIG. 9 is a schematic view of the metering system.

Manometer 150 is filled with water and a valve V-159 regulates the supply thereof. Manometer 150 is also provided with a calibrated scale 160, as shown.

In operation, fuel oil enters the collapsed or partially-filled container 20 through hose 61, as above described. As container 20 fills up, fuel passes through perforated plate 107 into lower chamber 105 and begins to fill pressure line 110. Fuel also flows into upper chamber 106 via slot 132 in push rod 117, circular slot 133 in upper surface 113b of bearing 113, and radially-extending slots 134, as above described. As upper chamber 106 begins to fill up, fuel oil flows into pressure line 111.

At this stage in the operation, valves V-152 and V-155 are closed and valves V-110, V-111, V-153 and V-156 are open. The valves remain in this position until all air has been expelled from pressure lines 110 and 111 and fuel oil fills both lines at least to a point above valves V-153 and V-156. When this occurs, valves V-153 and V-156 are closed.

When valve V-156 is closed, fuel oil pumped into upper chamber 106 will cause rubber diaphragm 123 to be pushed upwardly against the pressure exerted by the water depth on its upper surface. When diaphragm 123 adopts a horizontal position (see the phantom lines in FIG. 6), the pressure in upper chamber 106 exactly balances the water pressure above. At this point push rod 117 will have moved up sufficiently far in bearing 113 to cause O-ring seals 136 to come into engagement with bearing 113, also as shown in the phantom lines in FIG. 6. This action will close off slot 132 in push rod 117, thereby preventing any additional fuel oil from entering upper chamber 106.

The operation up to this point is completely automatic. If valves V-152 and V-155 are now opened, the oil pressure can act on the water levels in manometer 150. This will permit the difference between the pressure in upper chamber 106 and lower chamber 105 to be read by the height differential of the water columns in manometer tubes 151 and 154.

Thus, manometer 150 is equipped to measure the pressure differential of the fuel oil within each of pressure lines 110 and 111.

An illustrative example will indicate how the metering system gauges the volume of fuel contained in container 20 at any time. Container 20 with a 50,000 gallon capacity is six feet deep when filled, as previously described. For purposes of illustration, it will be assumed that the top of the container is 50 feet below the surface of a body of sea water.

If we assume that the fuel oil contents has a specific gravity of 0.85 and that the specific gravity of sea water is 1.03, the 50-foot head of sea water at the top of the container will support a column of fuel oil 60.6 feet high. This would amount to a height differential of oil above sea water of 10.6 feet.

Since the container is 6 feet deep, the pressure at the bottom is equal to that exerted by 56 feet of sea water and is equivalent to a 67.9 foot high column of oil. The pressure differential then, that is, the height of an oil column above the sea-water surface, is 11.9 feet (67.9 feet minus 56 feet).

Thus, when valves V-152 and V-155 are opened, manometer 150 will measure a height differential or pressure differential within pressure lines 110 and 111 of 1.3 feet of oil (11.9 feet minus 10.6 feet). This pressure differential reduces to an equivalent pressure of 13.3 inches of water. Thus, when container 20 is completely filled, the difference in water-column heights between tubes 151 and 154 of manometer 150 will be 13.3 inches. It is obvious that by calibrating manometer scale 160 properly, during an initial filling operation, it is possible to determine accurately the amount of fuel oil in gallons within container 20 by a direct reading from the calibrated scale.

Thus, the metering system herein described is capable of indicating the quantity of liquid stored in container 20 at any time. Since the instrumentation equipment is self-contained, any type of vessel can use the storage system without having to install special equipment.

*Submerged Swivel Buoy*

FIGS. 1 and 10-12 show the intermediate underwater floating swivel-type buoy 250, which can be used to protect container 20 from contact with hose 60 and the various anchor lines required. Buoy 250 is also adapted to prevent fouling of the various lines and cables needed by the overall system. Broadly, buoy 250 comprises a buoyant chamber 252 and a pipeline section 253, which is attached to buoyant chamber 252 within a center cylindrical opening 254 therein.

As shown in FIG. 1, hose 60 and pressure lines 110 and 111 are attached to floating buoy 300 for ease in filling and emptying the storage system. As varying wind, wave and tide conditions are encountered, floating buoy 300 will shift in position relative to the underwater storage system, which action would ordinarily tend to foul lines and cables. To negate this possibility, buoy 250 is provided. The buoy permits all necessary lines to emanate from a single point, acting as an underwater swivel, and thus keeps the submerged lines free.

Buoyant chamber 252 is preferably cylindrical in shape and, as above mentioned, contains a cylindrical opening 254 passing vertically through its center. Chamber 252 is further divided into four sub-chambers by bulkheads 255, thus to lessen the chance of buoyant failure. (See FIG. 11.) Positioned on the outer surface of chamber 252 is a lug 256, to which cable 301 is attached. (See FIG. 10.) Cable 301 maintains floating buoy 300 in position, as above mentioned.

Figures 10, 11, 12:
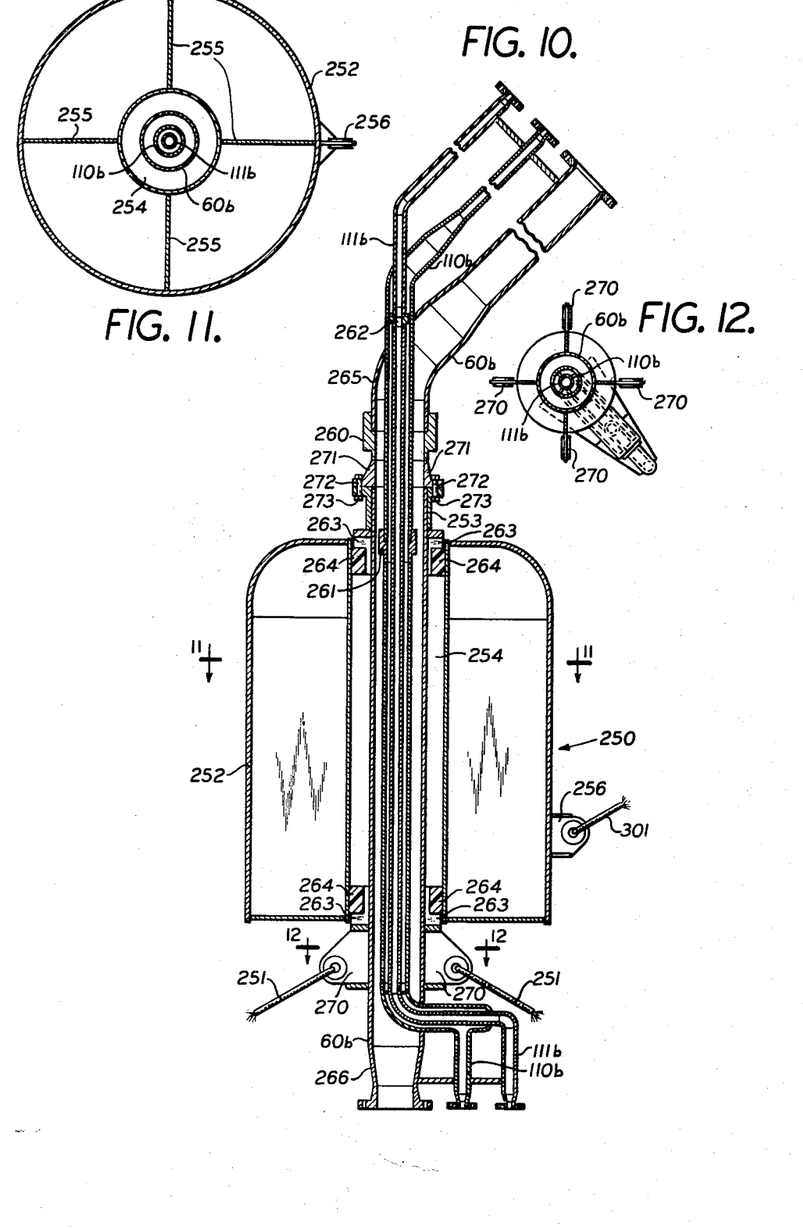
FIG. 10 is a sectional view taken on line 10—10 of FIG. 1, showing the details of construction of the underwater buoy.
FIG. 11 is a sectional view taken on line 11—11 of FIG. 10.
FIG. 12 is a sectional view taken on line 12—12 of FIG. 10.

Pipeline section 253 is positioned within buoyant chamber 252, as above mentioned, in such a manner that chamber 252 can rotate thereabout. Section 253 furnishes continuity for hose 60 and pressure lines 110 and 111.

As shown in FIG. 10, section 253 is adapted to transmit the fuel oil that passes through hose 60 and pressure lines 110 and 111 through separate pipelines therein, which pipelines are located one within the other. The pipelines are respectively designated 60b, 110b and 111b. Line 60b furnishes continuity to hose 60; line 110b furnishes continuity to pressure line 110; and line 111b furnishes continuity to pressure line 111. Pressure line 110 connects lower chamber 105 of signaling device 100 to manometer 150; pressure line 111 connects upper chamber 106 of signaling device 100 to manometer 150; all as previously described.

As shown in FIGS. 10 and 11, line 111b is disposed within line 110b; line 110b is itself disposed within line 60b. This construction permits buoy 250 to rotate freely about its vertical axis.

Line 60b is provided with a swivel joint 260, as, for example, a standard 8 inch swivel joint of galvanized metal, which permits rotation about the vertical axis. Line 110b is provided with a swivel joint 261, as, for example, a standard 3 inch swivel joint of stainless steel, which permits rotation about its vertical axis. Finally, line 111b is provided with a swivel joint 262, as, for example, a standard 1 inch swivel joint of stainless steel, which permits it to rotate about its vertical axis. Thus, lines 60b, 110b and 111b can be swiveled about the vertical axis of the entire buoy 250 as a single unit, although none of the three lines can itself swivel independently of the other two.

Line 60b is provided with flanged fittings 263 adapted to contact bearings 264, which are themselves attached to chamber 252. Bearings 264 may conveniently be made of "Teflon" brand of plastic bearing material. This construction permits chamber 252 to rotate with respect to section 253, as above described.

It will be noted that, in general, the upper section 265 of section 253 swivels in much the same manner as buoyant chamber 252, as each is attached to floating buoy 300. The lower section 266 of section 253 will, in general, remain stationary relative to container 20, as this section is attached thereto.

Lower section 266 is provided with four radial lugs 270 (see FIGS. 10 and 12), to which are attached the four steel cables 251, above mentioned.

If desired, means for connecting line 60b, should the latter be desired to be constructed in two parts, may be positioned immediately below swivel joint 260. Such means comprise flanged fittings 271, which may be attached together by means of bolts 272 and nuts 273.

Thus, buoy 250 is seen to be well suited to the type of underwater storage system herein disclosed. Buoy 250 not only protects container 20 from contact with hose 60 and the various anchor lines required, but its swivel action also prevents fouling of the various lines and cables.

*Multi-Container Storage System*

Figure 3:
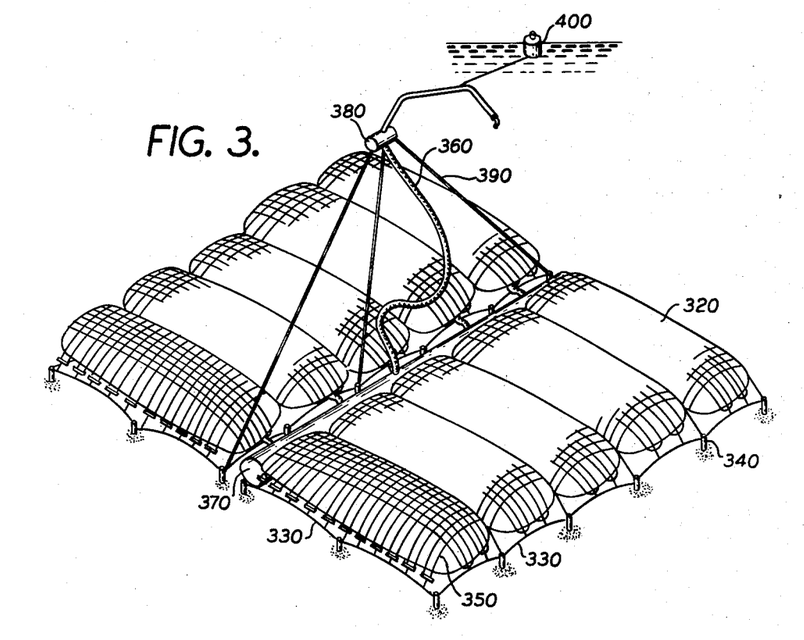
FIG. 3 is a perspective view of a multi-container underwater storage system constructed in accordance with our invention and capable of storing amounts up to 25,000 barrels.

FIG. 3 shows a multi-container underwater storage system suitable for quantities of liquids in the range of 25,000 barrels. The system comprises a plurality of collapsible containers 320 anchored to the bottom by piles 340. Piles 340 are interconnected by cables 330. A network of straps 350 forms a tank-restraining harness encasing each container 320 and suspending it within cables 330.

Although the individual containers 320 may be designed to hold 50,000 gallons (as shown in the system disclosed in FIG. 1), containers holding 100,000 gallons may desirably be used. The containers 320 are preferably connected to a header tank 370, so that only one filling and emptying hose 360 is needed.

An underwater buoy 380 is provided to protect the individual containers 320 from contact with hose 360 and the various anchor lines required. Buoy 380 is maintained in position by steel cables 390.

Hose 360 is supported adjacent the surface of the water by a floating buoy 400, as shown.

Having thus described our invention, what we claim and desire to protect by Letters Patent is:

1. An automatic shut-off valve for flexible-walled collapsible containers, comprising a body portion adapted to be mounted over a filling opening in the upper wall of such a container, said body portion being further adapted to receive fluids for filling said container through said opening; a valve seat disposed in said body portion, said seat forming a passageway through which said fluids pass; a plunger mounted above said valve seat and adapted to seal the same, said plunger having an upper surface adapted to receive the pressure of said fluids as they pass through said valve, said plunger having an axially disposed opening therethrough; a shaft disposed vertically within said opening in said plunger and passing through said passageway, the upper portion of said shaft being of a reduced diameter as compared to the lower portion of said shaft; a stationary sleeve disposed around said shaft and passing through said opening in said plunger and through said passageway, said sleeve being provided with a plurality of radial openings, said opening in said plunger being provided with a locking circumferential shoulder facing said shaft, said radial openings in said sleeve being adapted to register with said locking shoulder when said plunger is in the open position; a plurality of locking balls, one of said balls being disposed in each radial opening in said sleeve, said balls being adapted to engage said locking shoulder to lock said plunger in the open position when the lower portion of said shaft is adjacent said radial openings, said balls being movable inwardly adjacent said reduced diameter upper portion of said shaft as said shaft is pulled downwardly through said openings in said plunger, thereby to release said plunger; a first spring in contact with said upper surface of said plunger and adapted to urge said plunger toward said valve seat upon inward movement of said balls; a second spring adapted to urge said plunger away from said valve seat upon cessation of flow of fluids through said valve; and a lanyard connected at one of its ends to said lower portion of said shaft, the other end of said lanyard being attached to the opposite wall of said container, whereby overfilling of said container causes said lanyard to pull said shaft downwardly through said opening in said plunger, thereby to permit inward movement of said balls and release said plunger, whereby said first spring and the pressure of said fluids on the upper surface of said plunger in combination force said plunger downwardly to seal said valve seat and prevent further flow of fluids through said passageway into said container.

2. In the valve of claim 1, damping means to prevent sharp contact between said plunger and said valve seat, said damping means comprising a chamber attached to said body portion and positioned below said plunger, the lower portion of said plunger being adapted to fit within said chamber as said plunger descends to seal said valve seat, and vent means adapted to permit the escape of fluid trapped between said lower portion of said plunger and said chamber.

3. The valve of claim 2, in which said vent means comprises a vent hole in said chamber.

4. In the valve of claim 1, a spring retainer plate attached to said upper portion of said shaft, a second sleeve attached to said upper surface of said plunger and disposed around said shaft, said first spring surrounding and being coaxial with said second sleeve and being contained between and exerting pressure against said spring retainer plate and said upper surface of said plunger, whereby excessive downward movement of said shaft will cause said first spring to be compressed an amount sufficient to permit said spring retainer plate to engage said second sleeve and any additional and continued downward movement of said shaft will then force said plunger downwardly to seal said valve seat.

References Cited in the file of this patent

UNITED STATES PATENTS

| | | |
|---|---|---|
| 2,352,680 | Armitage | July 4, 1944 |
| 2,363,123 | Franck | Nov. 21, 1944 |
| 2,383,840 | Benckert | Aug. 28, 1945 |
| 2,582,195 | Duerr | Jan. 8, 1952 |